Figure 1:
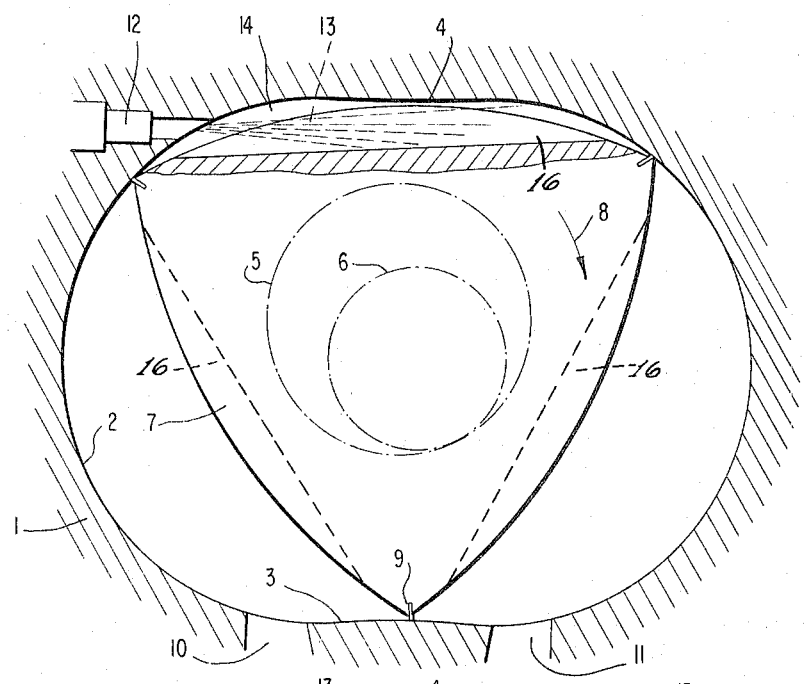

3,289,648
ROTARY PISTON ENGINE
Alfred H. Müller, Waiblingen, Germany, assignor to Daimler-Benz Aktiengesellschaft, Stuttgart-Unterturkheim, Germany
Filed Sept. 2, 1964, Ser. No. 393,905
Claims priority, application Germany, Sept. 6, 1963, D 42,412
11 Claims. (Cl. 123—8)

The present invention relates to a rotary piston diesel-type internal combustion engine, especially of trochoidal construction in which a triangular piston is rotatably supported on the eccentric of an eccentric shaft within a housing having lateral parts and a casing provided with a two-arched internal cam surface which forms two zones more close to or approaching the axis, which piston during its movement relative to the casing and to the eccentric shaft slides with its corners along the internal cam surface and thereby controls the gas exchange channels consisting of inlet and outlet channels arranged within the area of one zone approaching the axis.

With the known diesel internal combustion engines of this type the entire fuel is injected for the most part very directly againts the walls of the combustion space or against the flanks of the piston. This has the disadvantage that the mixture formation is made difficult and impaired by reason of the short free lengths of the jets so that a poor combustion and a high fuel consumption results. In order to improve the mixture formation, the present invention proposes to arrange the injection nozzle in the casing of the housing with such an inclination or to dispose the injection direction of the injection nozzle in such a manner that the injected fuel is directed essentially in the longitudinal direction of the compression space either in or against the direction of rotation of the piston. If the injection takes place in the direction of rotation of the piston, and therewith in the direction of the air-stream, that is, substantially uniflow with the air, then a very long fuel jet is to be expected which causes a uniform mixture distribution over the entire length of the combustion space. If, in contrast thereto, the injection takes place opposite the direction of rotation of the piston and therewith opposite the air-stream, that is, counter-current to the air stream, then the fuel jet is prematurely torn apart and broken up by the combustion air that has a high velocity so that also in this case a good mixture formation takes place in the entire combustion space.

Accordingly, it is an object of the present invention to provide a rotary piston diesel-type internal combustion engine which obviates the shortcomings and drawbacks encountered with the prior art constructions by extremely simple means.

It is another object of the present invention to provide a rotary piston internal combustion engine of trochoidal construction, operable as diesel engine, in which the injection system is so constructed and arranged as to assure improved mixture formation throughout substantially the entire combustion space.

A still further object of the present invention resides in the provision of a diesel-type rotary piston internal combustion engine which exhibits improved combustion processes and therewith lower fuel consumption.

Figure 2:
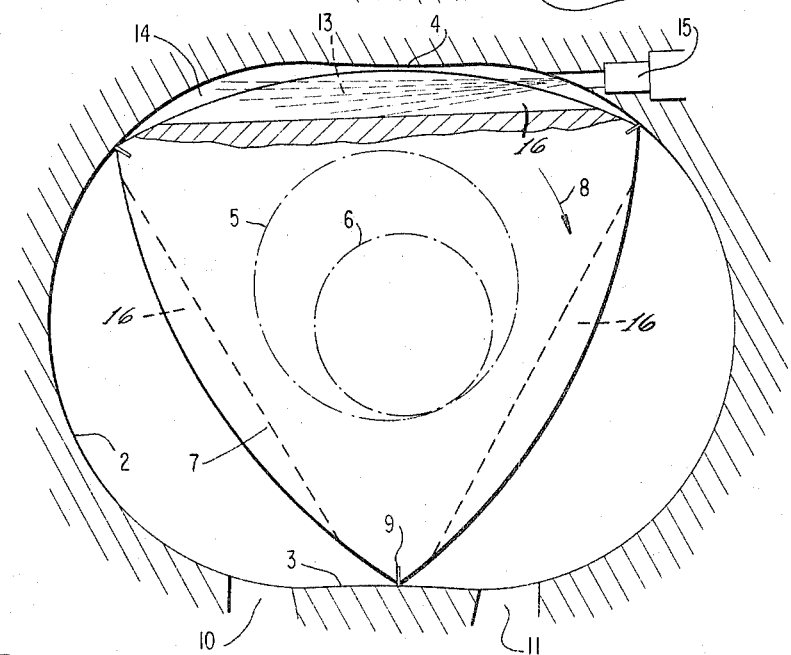

These and other objects, features, and advantages of the present invention will become more obvious from the following description when taken in connection with the accompanying drawing which shows, for purposes of illustration only, two embodiments in accordance with the present invention, and wherein FIGURE 1 is a partial transverse cross sectional view through a rotary piston diesel-type internal combustion engine in accordance with the present invention with an injection nozzle injecting in the direction of rotation of the piston, and;

FIGURE 2 is a partial cross sectional view, similar to FIGURE 1, of a modified embodiment of a rotary piston diesel-type internal combustion engine in accordance with the present invention in which the injection nozzle injects the fuel in the direction opposite the direction of rotation of the piston.

Referring now to the drawing wherein like reference numerals are used throughout the two views to designate like parts, reference numeral 1 designates in both views the engine casing providing the two-arched internal cam surface 2 which effectively form the two zones 3 and 4 more close to the axis of the engine. The triangular piston 7 is rotatably arranged in the direction of arrow 8 on the eccentric 5 of the eccentric shaft 6. The piston 7 slides with the sealing bars 9 arranged at the piston corners thereof along the internal surfaces 2 and thereby controls the gas exchange channels, namely the inlet channel 10 and the outlet channel 11 arranged within the area of the zone 3 approaching more closely the axis.

The injection of the fuel takes place in FIGURE 1 by means of the injection nozzle 12 which is arranged in the engine casing 1 with such inclination that the fuel jet 13 is directed essentially in the longitudinal direction of the combuston space 14 in the direction of rotation 8 of the piston 7. The fuel jet is therefore injected with the flow of the combustion air, i.e., in uniflow therewith so that a long jet and therewith a uniform mixture formation can be expected over the entire combustion space 14.

In the case of the embodiment according to FIGURE 2, the injection nozzle 15 is so arranged in the casing 1 that the fuel jet 13 is directed substantially opposite the direction of rotation 8 of the piston 7 and therewith opposite the flow of combustion air, that is, in counter flow essentially in the longitudinal direction of the combustion space 14. The injected fuel is thereby torn apart or broken up by the combustion air flowing with high velocity so that a good mixture formation takes place in the entire combustion space 14.

To enable the injection of the fuel 13 as indicated in FIGURES 1 and 2, each flank of the pistons 7 of FIGURES 1 and 2 is provided with a trough or recess 16 extending at both ends to a point near the respective piston corner. As a result of such trough 16, the fuel jet 13 can be injected substantially over the entire length of the combustion space 14.

If it should become necessary and/or desirable to inject a part of the fuel against the piston flanks, then the direction of the fuel jet and/or the opening angle of the fuel jet can be chosen correspondingly.

In case the direction of the fuel jet is achieved by an inclination of the injection nozzle, the injection nozzle has a beveled-off forward end that is adapted and matched to the contour of the internal surfaces 2 of the housing 1 in order that additional dead space and overblow losses can be avoided.

While I have shown and described two embodiments in accordance with the present invention, it is understood that the same is not limited thereto but is susceptible of numerous changes and modifications as known to a person skilled in the art. Thus, for example, with very wide pistons, two or more injection nozzles may be arranged one behind the other of which only one injection nozzle operates, for example, at partial loads. Combustion space recesses may be provided in the piston flanks corresponding to the number of injection nozzles.

Thus, while I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:
1. A rotary piston diesel-type internal combustion engine, especially of trochoidal construction, comprising:
   housing means having lateral parts and effectively forming internal surface means of two-arched shape forming two zones in proximity to the engine axis,
   inlet and outlet channel means arranged in said housing means within the area of one of said zones,
   eccentric shaft means provided with an eccentric means,
   triangular shaped piston means rotatably supported on said eccentric means, said piston means sliding with the piston corners thereof along said internal surface means during movement relative thereto to said housing means and to said eccentric shaft means thereby controlling the inlet and outlet channel means arranged within one of said zones, said piston means, during relative rotation thereof, effectively forming together with the internal surface means of said housing means a suction space and a compression space, said compression space being located substantially opposite the area of said one of said zones,
   and injection nozzle means in said housing means including means for injecting a diesel fuel jet into the compression space substantially in the longitudinal direction thereof.

2. A rotary piston diesel-type internal combustion engine according to claim 1, wherein said fuel-injecting means is located near one end of the compression space as viewed in the circumferential direction of the rotary movements of the piston means, the piston means being provided with an elongated piston recess in each piston flank which extends with both ends thereof to the vicinity of the corresponding piston corners, and the fuel-injecting means injecting at least a substantial portion of the fuel in the direction of said recess.

3. A rotary piston diesel-type internal combustion engine according to claim 2, wherein the piston recess means are of such depth as to permit the fuel jet to pass from one partial compression space to the other partial compression space formed by the constriction within the area of the opposite one of said two zones.

4. The combination according to claim 1, in which the fuel jet is injected into the combustion space with the piston means in a position near the top dead-center position thereof.

5. A rotary piston diesel-type internal combustion engine, especially of trochoidal construction, comprising:
   housing means having lateral parts and effectively forming internal surface means of two-arched shape forming two zones in proximity to the engine axis,
   inlet and outlet channel means arranged in said housing means within the area of one of said zones,
   eccentric shaft means provided with an eccentric means,
   triangular shaped piston means rotatably supported on said eccentric means, said piston means sliding with the piston corners thereof along said internal surface means during movement relative thereto to said housing means and to said eccentric shaft means thereby controlling the inlet and outlet channel means arranged within one of said zones,
   said piston means, during relative rotation thereof, effectively forming together with the internal surface means of said housing means a suction space and a compression space, said compression space being located substantially opposite the area of said one of said zones,
   and injection nozzle means in said housing means including means for injecting a diesel fuel jet into the compression space substantially in the longitudinal direction thereof essentially in the direction of rotation of said piston means.

6. A rotary piston diesel-type internal combustion engine, especially of trochoidal construction, comprising:
   housing means having lateral parts and effectively forming internal surface means of two-arched shape forming two zones in proximity to the engine axis,
   inlet and outlet channel means arranged in said housing means within the area of one of said zones,
   eccentric shaft means provided with an eccentric means,
   triangular shaped piston means rotatably supported on said eccentric means, said piston means sliding with the piston corners thereof along said internal surface means during movement relative thereto to said housing means and to said eccentric shaft means thereby controlling the inlet and outlet channel means arranged within one of said zones,
   said piston means, during relative rotation thereof, effectively forming together with the internal surface means of said housing means a suction space and a compression space, said compression space being located substantially opposite the area of said one of said zones,
   and injection nozzle means in said housing means including means for injecting a diesel fuel jet into the compression space substantially in the longitudinal direction thereof essentially opposite the direction of rotation of said piston means.

7. A rotary piston diesel-type internal combustion engine, comprising:
   housing means provided with internal cam surface means and forming a compression space,
   eccentric shaft means provided with an eccentric means,
   piston means rotatably supported on said eccentric means and provided with elongated recess means in each piston flank, said piston means sliding with the piston corners thereof along said internal cam surface means during movement thereof relative to said housing means and to said eccentric shaft means to form effectively a suction space and a compression space,
   and means for injecting at least a substantial portion of the fuel jet into the compression space substantially in the longitudinal direction thereof.

8. The internal combustion engine according to claim 7, wherein the substantial portion of the fuel jet is injected substantially in the direction of the air stream within said compression space.

9. The internal combustion engine according to claim 7, wherein the substantial portion of said fuel jet is injected into the compression space substantially opposite the direction of the air flow.

10. The internal combustion engine according to claim 7, wherein said piston means is provided with several elongated recess means in each piston flank, spaced from one another in the axial direction, and wherein said injecting means includes a plurality of injection nozzles, one injection nozzle for each compression space coordinated to a corresponding recess means.

11. The combination according to claim 7, in which the fuel jet is injected into the combustion space with the piston means in a position near the top dead-center position thereof.

References Cited by the Examiner

UNITED STATES PATENTS 3,174,466    3/1965    Scherenberg _____ 123—8

OTHER REFERENCES

Wankel et al.: Bauart und gegenwartiger Entwicklungsstand einer Trochoiden - Rotationskolbenmaschine. In MTZ 21(2), pp. 33–45, February 1960.

MARK NEWMAN, *Primary Examiner.*

F. T. SADLER, *Assistant Examiner.*